June 23, 1964  MASUMI AIHARA ETAL  3,138,452
OPEN-HEARTH FURNACE OPERATING METHOD
Filed Oct. 3, 1961

INVENTORS
Masumi Aihara
BY Kazuo Kitajima
Wenderoth, Lind and
Ponack, Attorneys

3,138,452
OPEN-HEARTH FURNACE OPERATING METHOD
Masumi Aihara and Kazuo Kitajima, both of Yawata, Fukuoka Prefecture, Japan, assignors to Yawata Iron & Steel Company, Limited, Tokyo, Japan, a corporation of Japan
Filed Oct. 3, 1961, Ser. No. 142,623
Claims priority, application Japan Oct. 8, 1960
1 Claim. (Cl. 75—60)

This invention relates to an open-hearth furnace operating method.

For some years, oxygen has often been utilized in an open-hearth furnace steel manufacturing process. Various researches have been made on the most effective method of utilizing oxygen. It is now well known that blowing oxygen directly into molten steel is most effective.

In an open-hearth furnace steel manufacturing process using molten pig-iron, the conventional sequence of steps is that scrap iron and flux are put in first and, when the temperature within the furnace has risen, molten pig-iron is put in and the furnace is operated.

In such case, oxygen is used as shown in Table 1. The most effective way of using oxygen is B and the next are C and A.

*Table 1.—Method of Using Oxygen in Various Periods of Manufacturing Steel in Open-Hearth Furnace*

| Periods | Methods of using oxygen | Remarks |
|---|---|---|
| 1. Charging period | A | A: Fuel is supplementally fed through a burner. |
| 2. Pre-melting period | A+C | B: Oxygen is blown into a steel bath through a lance. |
| 3. Post-melting period | A+B | C: Scrap is cut by oxygen through a lance. |
| 4. Refining period | A+B | |

However, the operating methods used today have the following defects:

(1) In the furnace, which is heated to the highest temperature at the time of tapping, the temperature will fall due to the charging with such cold materials as scrap and limestone, the generally used basic bricks of the furnace lining will be thereby adversely affected and the life of the ceiling will be shortened.

(2) As the respective charging, melting and refining periods are operated in series, the steel manufacturing time will become longer.

(3) By using a large amount of oxygen, the duration of the periods other than the charging period can be shortened. However the charging period will be so restricted by the capacity of the charging crane as to be very difficult to shorten. Especially in the case of a large-sized furnace, which is to be charged with a great amount of scrap, much time is required to complete the charging operation. For instance, it will take about one and one half or two hours to charge a 200-open-hearth furnace with scrap material.

Therefore, the object of the present invention is to eliminate the above mentioned defects.

A principal object of the present invention is to reduce the steel manufacturing time and obtain a high steel manufacturing efficiency by simultaneously operating the charging period and the pig-iron receiving and post-melting period by eliminating the pre-melting period.

Other objects of the present invention will be made clear by the following explanation and the attached drawings.

The present invention will now be described in detail. In the conventional open-hearth furnace operation, for example, wherein oxygen is not used, all the heat required to melt such cold materials as scrap and limestone is obtained from burning such fuel as heavy oil or coke furnace gas. In such a conventional operating method, if the scrap and flux pre-melting period is eliminated and the charging, molten pig iron receiving and post-melting are carried out simultaneously, the cold materials will sink into the molten steel before it can heat the added materials. Because of the poor heat conducting properties of the slag, the added materials will take up heat from the molten steel before they can be heated by heat coming through the slag, and the steel bath will be cooled and at least start to coagulate.

When more than 15 m.³, for example 20 m.³, of oxygen are used per ton of ingot in the molten pig iron charge, more than about 50% of the heat required for melting and refining can be directly produced in the steel bath and will heat the added materials directly, and also the melting will progress easily.

Figure 1:
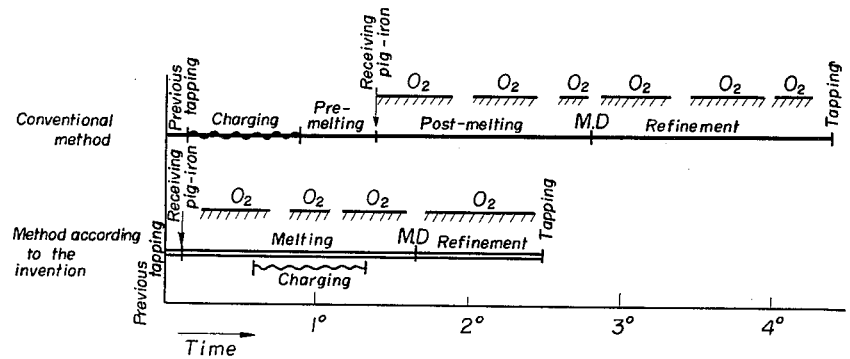
FIGURE 1 is a diagrammatic representation of refining processes in a conventional method and in the method according to the present invention.
Figure 2:
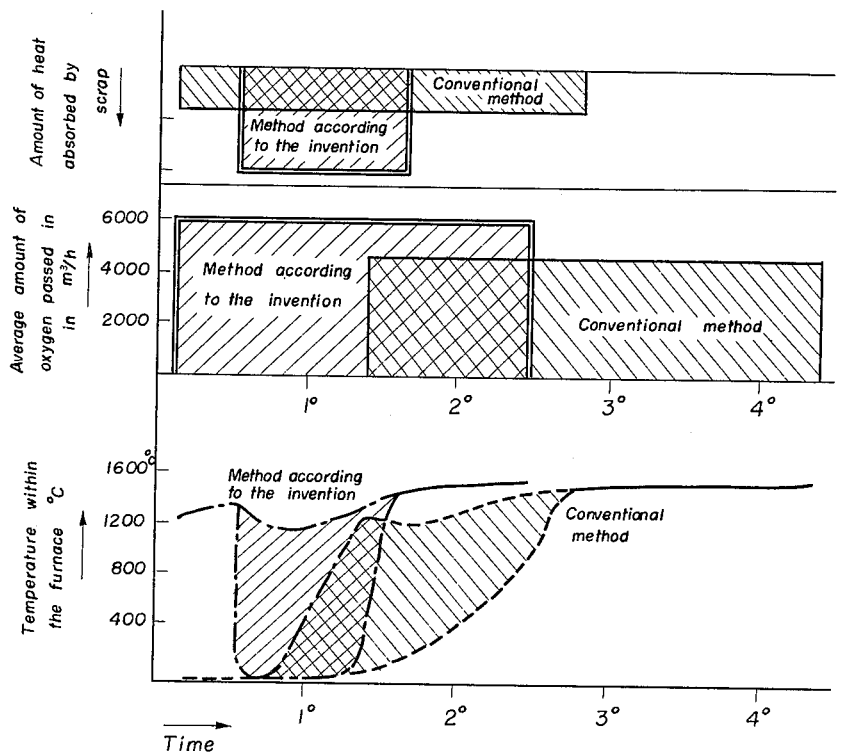
FIGURE 2 is a diagrammatic representation of the amounts of heat absorbed by scrap, average amounts of oxygen passed in and temperatures within the furnaces in the present invention and in the conventional method.

That is to say, when the representative embodiments of the present invention and the conventional method are compared in FIGURE 2, it will be found that, in the conventional method, the period of passing in oxygen lags so far behind the period of elevating the heat of scrap that the effective oxidation heat generated by the oxygen blown into the steel bath will not be well utilized for melting, whereas, in the present invention, as both periods coincide with each other, the oxygen will be effectively utilized.

In carrying out the method according to the present invention the mixing ratio of scrap and molten pig iron to be charged in an open-hearth furnace is of significance. Molten pig iron should be mixed at a ratio of at least 40%. When molten pig iron is mixed at a ratio of 60%, the effects to be achieved by the present invention are remarkable.

The advantages of the present invention are as follows:

(1) As the charging period and the melting period are simultaneous, the operating time can be greatly reduced. This is effective especially in a large furnace with a long charging time. By adopting the method according to the present invention the operating time may be reduced to half the time required in carrying out the conventional methods.

(2) The steel manufacturing time is so short that the steel manufacturing efficiency will rise to be approximately twice as high.

(3) The steel manufacturing time is so short that the heat dissipation from the furnace will be low and the unit for supplying fuel for heating can be reduced to approximately ½ to ⅓ the size of conventional units.

(4) In the method according to the present invention the oxygen blowing is carried out during the melting period of molten pig iron, while in the conventional methods it is carried out after the pre-melting of charged scrap is finished. Thus the oxygen is immediately blown onto the molten pig iron, whereby the elimination of C, Si, Mn and P contained in said pig iron by the oxidation thereof may be effectively performed.

(5) Scrap comes into direct contact with the heavy oil flame for such a short time that the absorption of sulfur will be small and the amount of oxidation will be small.

(6) As oxygen can be turned to the efficient method B from the inefficient methods A and C, it will be advantageous.

*Examples*

| Operating method | Steel manufacturing time | | Tons of good ingots | Steel manufacturing efficiency, tons/hr. | Amount of used oxygen, m.³/hr. | Fuel per ton of iron Cal×10³ | Pig iron/ total charge, percent | Composition of the product in percent (remainder Fe) | | | | |
|---|---|---|---|---|---|---|---|---|---|---|---|---|
| | Hours | Minutes | | | | | | C | Si | Mn | P | S |
| Conventional method | 6 | 05 | 72 | 11.9 | 14.4 | 696 | 57.8 | <0.20 | 0.10 / 0.01 | 0.30 / 0.90 | <0.030 | <0.030 |
| Conventional method test open-hearth furnace No. 1 | 4 | 25 | 68.6 | 15.5 | 20.9 | 680 | 58.9 | 0.18 | 0.01 | 0.47 | 0.011 | 0.019 |
| Method according to the invention: | | | | | | | | | | | | |
| Test furnace No. 1 | 3 | 45 | 72.1 | 19.2 | 21.9 | 334 | 60.0 | 0.10 | 0.01 | 0.42 | 0.016 | 0.022 |
| Test furnace No. 2 | 3 | 00 | 72.0 | 24.0 | 27.0 | 267 | 59.1 | 0.10 | 0.01 | 0.47 | 0.019 | 0.020 |
| Test furnace No. 3 | 2 | 55 | 68.00 | 23.3 | 31.3 | 304 | 59.9 | 0.05 | 0.01 | 0.29 | 0.022 | 0.028 |
| Test furnace No. 4 | 2 | 25 | 76.5 | 31.7 | 25.4 | 196 | 59.8 | 0.08 | 0.01 | 0.36 | 0.015 | 0.025 |
| Test furnace No. 5 | 2 | 35 | 71.3 | 27.6 | 23.9 | 218 | 60.0 | 0.08 | 0.01 | 0.39 | 0.012 | 0.024 |

NOTE.—Fixed type 60-ton open-hearth furnaces were used. Composition of the molten pig-iron in percent: C, 4.0–4.5; Si, 0.55–0.70; Mn, 0.80–1.00; P, 2.00–0.300; S, 0.030–0.020, remainder Fe.

What we claim is:

In a method of making steel in an open-hearth furnace in which the furnace is charged with molten pig iron and the pig iron is heated, the steps of charging scrap into the furnace into the molten pig iron in order to be melted and simultaneously blowing oxygen into the molten pig iron in the furnace, the period of charging and melting of the scrap coinciding with the period of oxygen blowing.

References Cited in the file of this patent

The Iron Age, October 20, 1960, pages 158–160. Published by the Chilton Company, Philadelphia, Pennsylvania.